United States Patent
Liu

(10) Patent No.: US 8,463,059 B2
(45) Date of Patent: Jun. 11, 2013

(54) TWO-LAYER PREDICTION METHOD FOR MULTIPLE PREDICTOR-SET INTRA CODING

(75) Inventor: Lingzhi Liu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 226 days.

(21) Appl. No.: 13/007,881

(22) Filed: Jan. 17, 2011

(65) Prior Publication Data
US 2011/0262050 A1    Oct. 27, 2011

Related U.S. Application Data

(60) Provisional application No. 61/327,412, filed on Apr. 23, 2010.

(51) Int. Cl.
*H04N 7/50*    (2006.01)

(52) U.S. Cl.
USPC ............. 382/238; 382/232; 382/236

(58) Field of Classification Search
USPC ............. 382/232, 233, 236, 238; 348/207.99, 348/218.1; 375/240.12, 240.27, 240.26, 240.08
See application file for complete search history.

(56) References Cited

U.S. PATENT DOCUMENTS

| | | | |
|---|---|---|---|
| 7,453,941 B1 * | 11/2008 | Yamori et al. | 375/240.15 |
| 7,728,878 B2 * | 6/2010 | Yea et al. | 348/218.1 |
| 7,903,737 B2 * | 3/2011 | Martinian et al. | 375/240.12 |
| 8,149,910 B2 * | 4/2012 | Tanizawa et al. | 375/240.12 |
| 8,204,113 B2 * | 6/2012 | Kondo et al. | 375/240.12 |
| 2010/0329341 A1 | 12/2010 | Kam et al. | |

OTHER PUBLICATIONS

Ye, Yan, "Improved H.264 Intra Coding Based on Bi-Directional Intra Prediction, Directional Transform, and Adaptive Coefficient Scanning," ICIP, 2008, pp. 2,116-2,119.

Tsukuba, Takeshi, et al., "Adaptive Multidirectional Intra Prediction," ITU-T Q.6/SG16 VCEG, VCEG-AG05, Oct. 20, 2007, 6 pages.

Yang, Jiheng, et al., "A Block-Matching Based Intra Frame Prediction for H.264/AVC," ICME, 2006, pp. 705-708.

Ye, Yan, et al., "Improved Intra Coding," ITU-T Q.6/SG16 VCEG, VCEG-AG11, Oct. 20, 2007, 6 pages.

Bjontegaard, Gisle, "Calcuation of Average PSNR Differences Between RD-Curves," ITU-T Q.6/SG16 VCEG, VCEG-M33, Apr. 2-4, 2001, 4 pages.

Bjontegaard, Gisle, "Improvements of the BD-PSNR Model," ITU-T Q.6/SG16 VCEG, VCEG-AI11, Jul. 16-18, 2008, 2 pages.

(Continued)

*Primary Examiner* — Anh Do
(74) *Attorney, Agent, or Firm* — Conley Rose, P.C.; Grant Rodolph; Clint Wilkins

(57) ABSTRACT

An apparatus comprising a processor configured to receive a current block of an image, determine an optimal prediction mode of a plurality of prediction modes for the current block, wherein the optimal prediction mode corresponds to either a standard predictor set or a non-standard predictor set, predict a predicted predictor set based on a first known predictor set and a second known predictor set, clear a first flag if the predicted predictor set matches the optimal predictor set; and set the first flag if the predicted predictor set does not match the optimal predictor set.

20 Claims, 6 Drawing Sheets

OTHER PUBLICATIONS

JCT-VC, "Joint Call for Proposals on Video Compression Technology," ITU-T Q6/16 and ISO/IEC JTC1/SC29/WG11, VCEG-AM91, Jan. 17-22, 2010, 19 pages.

Liu, Lingzhi, "Multiple Predictor Sets for Intra Coding," JCT-VC of ITU-T SG16 WP3 and ISO/IEC JTC1/SC29/WG11, JCTVC-A022, Apr. 15-23, 2010, 10 pages.

"Series H: Audiovisual and Multimedia Systems, Infrastructure of Audiovisual Services—Coding of Moving Video, Advanced Video Coding for Generic Audiovisual Services," ITU-T H.264, Mar. 2010, 676 pages.

* cited by examiner

TWO-LAYER PREDICTION METHOD FOR
MULTIPLE PREDICTOR-SET INTRA
CODING

CROSS-REFERENCE TO RELATED APPLICATIONS

This application claims the benefit of U.S. Provisional Application No. 61/327,412 filed Apr. 23, 2010 by Lingzhi Liu and entitled "Two Layer Prediction Method for Multiple Predictor-Set Intra Coding", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, for example when the data is to be streamed or otherwise communicated across a communications network with limited bandwidth capacity. Thus, video data is generally compressed prior to being communicated across modern day telecommunications networks. Video compression devices often use software and/or hardware at the source to encode the video data prior to transmission, thereby decreasing the quantity of data needed to represent digital video images. The compressed data is then received at the destination by a video decompression device that decodes the video data. Improved compression/decompression techniques that increase compression ratios without substantially reducing image quality are desirable due to limited network resources.

SUMMARY

In one embodiment, the disclosure includes an apparatus comprising a processor configured to receive a current block of an image, determine an optimal prediction mode of a plurality of prediction modes for the current block, wherein the optimal prediction mode corresponds to either a standard predictor set or a non-standard predictor set, predict a predicted predictor set based on a first known predictor set and a second known predictor set, clear a first flag if the predicted predictor set matches the optimal predictor set, and set the first flag if the predicted predictor set does not match the optimal predictor set.

In another embodiment, the disclosure includes an apparatus comprising a receiver unit configured to receive a coded data stream comprising a residual block, a first flag, and a second flag, wherein the residual block corresponds to a current block of an image, and logic circuitry configured to predict a predicted predictor set based on a first known predictor set and a second known predictor set, determine that a selected predictor set comprises the predicted predictor set when the first flag is cleared, and determine that a selected predictor set comprises a non-predicted predictor set when the first flag is set.

In yet another embodiment, the disclosure includes a method comprising predicting a predicted predictor set based on one or more known predictor sets, and determining whether a selected prediction mode's predictor set matches the predicted predictor set, predicting a predicted mode number based on one or more known mode numbers, and determining whether the selected prediction mode's mode number matches the predicted mode number.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
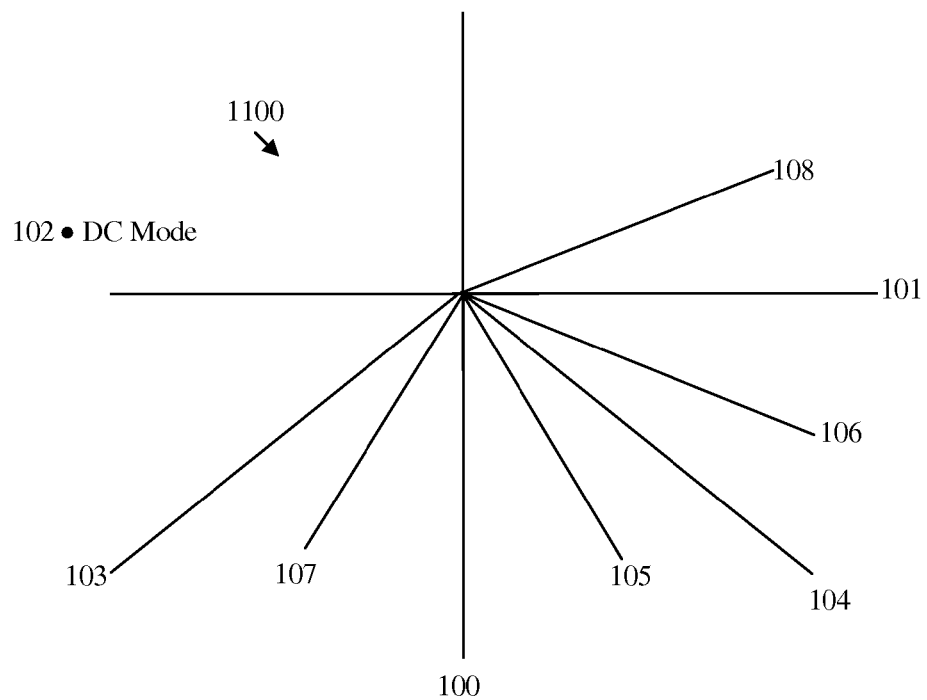
FIGS. 1A and 1B are schematic diagrams of embodiments of a predictor set that may be used during intra prediction.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g. 0, 1, ... or 256) that represents an image quality or characteristic, such as luminance or chrominance, at the corresponding reference point. Typically, groups of pixels (macroblocks) within a single frame may be substantially correlated with other macroblocks within the same frame such that pixel values across some macroblocks may vary only slightly and/or exhibit repetitious textures. Modern methods of video-compression exploit these spatial correlations using various techniques which may be known collectively as intra-frame prediction (hereinafter, intra prediction). Intra prediction may reduce spatial redundancies between adjacent and/or neighboring macroblocks (hereinafter, blocks) in the same frame, thereby compressing the video data without greatly reducing image quality. Different forms of intra prediction have been described by various conventional video/image coding standards, such as International Telecommunications Union (ITU) Telecommunications Standardization Sector (ITU-T)

H.264 (hereinafter, H.264) and International Organization for Standardization (ISO)/International Electrotechnical Commission (IEC) Moving Picture Experts Group (MPEG) 4 Visual, both of which are incorporated herein by reference as if reproduced in their entirety.

In practice, intra predication may be implemented by video coders/decoders (Codecs) to interpolate a predicted block from one or more previously coded/decoded neighboring blocks, thereby creating an approximation of the current block. Hence, the encoder and decoder may interpolate the predicted block independently, thereby enabling a substantial portion of a frame and/or image to be reconstructed from the communication of a relatively few number of reference blocks, e.g. blocks positioned in (and extending from) the upper-left hand corner of the frame. However, intra prediction alone does not reproduce an image of sufficient quality for modern video, and consequently an error correction message, e.g. a residual message, may be communicated between the encoder and decoder to correct differences between the predicted block and the current block. For instance, an encoder may subtract the predicted block from the current block to produce a residual block, which then may be transformed, quantized, and scanned before being encoded into the coded data stream. Upon reception of the coded data stream, a decoder may add the reconstructed residual block to the independently generated predicted block to recreate the current block. Although the recreated current block may be an imperfect version of the original current block, e.g. due to the lossy nature of intra prediction encoding, any differences may be so slight as to be virtually imperceptible to the human eye. Thus, substantial bit savings may be derived without noticeably reducing the quality of the reconstructed image.

The residual block may comprise differences between the predicted block and the current block, and therefore many of the residual block's discrete values, e.g. pixel data, may comprise zero and/or near-zero coefficients, e.g. in areas where the predicted block is identical and/or near-identical to the current block. Furthermore, transformation, quantization, and/or scanning of the residual block may remove many of the zero and/or near-zero coefficients from the data stream, thereby resulting in further compression of the video data. Consequently, coding efficiencies may result from more accurate predictions of the original image. To harness these coding efficiencies, conventional video/image coding standards may improve prediction accuracy by using a plurality of prediction modes, e.g. each of which generating a unique texture, during intra prediction. An encoder may select the prediction mode that generates the most accurate prediction for each current block, and as a consequence may make more accurate predictions (on average) than other encoders that may use fewer prediction modes. For instance, recent research has shown that conventions using 18 intra prediction modes may more accurately predict complex textures than conventions using fewer prediction modes, such as H.264, which uses nine intra prediction modes. However, the encoder and decoder must use the same prediction mode when independently generating a predicted block, and thus the encoder, in some instances, may be required to communicate the selected prediction mode in the overhead of the data stream, e.g. when the selected prediction mode does not match the predicted prediction mode. As a result, more possible prediction modes may result in greater amounts of overhead, thereby reducing (or in some cases eliminating) the bit savings achieved from the increased prediction accuracy.

For instance, a codec using a single prediction mode, e.g. a direct current (DC) prediction mode, may not require any overhead bits to communicate the prediction mode because the prediction mode remains fixed, and is therefore known by the decoder. Alternatively, a codec using nine possible prediction modes (e.g. mode-zero, mode-one, . . . , mode-eight) may require four bits of overhead to communicate the selected prediction mode to the encoder. Then again, a codec using 18 possible prediction modes may require five bits of overhead to communicate the selected prediction mode to the encoder. Four (or five) bits per block may constitute a substantial amount of overhead over the course of an entire frame and/or sequence of frames, and may significantly decrease coding efficiency. Hence, in some cases the bit savings that result from increased prediction accuracy may be partially (or completely) offset by the additional overhead required to communicate the additional prediction mode combinations.

To reduce the bit cost associated with increased prediction mode combinations, modern video codecs may attempt to predict the prediction mode of the current block based on the prediction modes of one or more neighboring blocks. For instance, if a neighboring block directly above the predicted block has a vertical prediction mode, the codec may predict that the prediction mode corresponding to the current block may also be vertical. If the selected prediction mode matches the predicted prediction mode, then the codec (e.g. the encoder) may clear a flag. Otherwise, the codec may set the flag. Importantly, the selected prediction mode is only encoded if the prediction is incorrect. Thus, only one bit of overhead, e.g. one flag bit, may be transmitted when the prediction is correct, thereby resulting in an overhead bit savings of three bits, e.g. versus direct communication of the prediction mode. Alternatively, four bits of overhead, e.g. one flag bit and three bits indicating the correct prediction mode, may be transmitted when the prediction is incorrect, thereby resulting in an overhead bit cost of one bit, e.g. versus direct communication of the prediction mode. Consequently, predicting the prediction mode may result in an overhead savings if the prediction is correct and an overhead cost if the prediction is incorrect. Codecs utilizing nine possible prediction modes are frequently, e.g. more often than not, able to correctly predict the prediction mode, and thus the single layer prediction method described above tends to be relatively effective in reducing overhead cost.

On the other hand, the overall probability that a codec will correctly predict the prediction mode decreases as more prediction modes, e.g. more than nine prediction modes, are used, and thus coding gains may become diminished. For instance, codecs using 18 possible prediction mode combinations (e.g. mode-one, mode-two, . . . mode-seventeen) are, ceteris paribus, less likely to correctly predict the selected prediction mode, e.g. because the ratio of correct answers to incorrect answers decreases proportionally. Consequently, a more efficient and/or effective method of predicting the selected prediction modes is needed for codecs using more than nine prediction modes, e.g. 18 prediction modes.

Disclosed herein is a two layer method for predicting the prediction mode during intra prediction of image/video encoding. Specifically, a codec may use a plurality of prediction modes, e.g. 18 prediction modes, during intra prediction, some or all of which may be divided into two predictor sets, e.g. a standard predictor set and a non-standard predictor set. The standard predictor set and the non-standard predictor set may have similar sub-set structures such that each predictor set comprises a directional sub-set e.g. comprising eight directional prediction modes, and a non-directional sub-set, comprising one non-directional prediction mode. Due to their similar sub-set structures, one or more of the prediction modes in the standard predictor set may correspond to one or more of the prediction modes in the non-standard predictor set. For example, each of the eight directional prediction modes of the non-standard predictor set may correspond to a unique one of the eight directional prediction modes of the standard predictor set. Additionally, the non-directional prediction mode of non-standard predictor set may correspond to the non-directional prediction mode of the standard predictor set. As such, corresponding prediction modes, e.g. in respective predictor sets, may be assigned a common mode number, e.g. zero, one, two, . . . eight. Thus, each prediction mode may correspond to a unique predictor-set/mode-number combination. Accordingly, a codec may employ a two-layer prediction technique to predict a predicted predictor set and/or predicted mode number, e.g. corresponding to a predicted prediction mode, based on the predictor set and/or mode number of the neighboring blocks, e.g. the previously coded/decoded blocks to the left and/or above the current block. For instance, the codec may make a first-layer prediction of the current block's predictor set based on the known predictor sets of the neighboring blocks. Subsequently, the codec may make a second-layer prediction of the current block's mode number based on the mode number of the neighboring blocks. Specifically, the first-layer prediction may be made independent from any known mode numbers, and the second-layer prediction may be made independent from any known predictor sets.

Codecs may be positioned throughout the network, and each codec may act as an encoder (e.g. on the transmitter side) or as a decoder (e.g. on the receiver side), or as both (e.g. when two-way communications are used). In an embodiment, an encoder may clear a first flag if the predicted predictor set matches the selected prediction mode's predictor set. Otherwise, e.g. if the predicted predictor set does not match the selected prediction mode's predictor set, the encoder may set the set the first flag. In some embodiments (e.g. when only two predictor sets are used), the first-layer prediction may correspond to an indexed predictor set (i.e. rather than a predicted predictor set), such that clearing the first flag indicates a first predictor set, e.g. a standard predictor set, while setting the first flag indicates a second predictor set, e.g. a non-standard predictor set. In those embodiments, the first-layer prediction may directly communicate the selected prediction mode's predictor set, rather than attempting to predict it based on the known predictor sets of neighboring previously coded/decoded blocks. An indexed first-layer prediction may simplify the two-layer prediction method when only two predictor sets are used by the codec, while a predicted first-layer prediction may increase coding efficiencies when more than two predictor sets are used. In some embodiments, a codec using only two predictor sets may nevertheless use a predicted first-layer prediction, e.g. to enable a subsequent expansion and/or uniformity within a communication system. Subsequently, the encoder may clear a second flag if the predicted mode number matches the selected prediction mode's mode number. Otherwise, the encoder may set the second flag and encode the selected prediction mode into the coded data stream.

Upon reception, the decoder may independently predict a predictor set and/or mode number based on the neighboring decoded blocks, and subsequently read the first and/or second flags to determine whether either (or both) of the predictions were correct. Alternatively, the decoder may read the flags prior to making predictions, e.g. for purposes of processing efficiency. If the first flag is cleared, the decoder may determine that the selected prediction mode's predictor set is equal to the predicted predictor set. Otherwise, the decoder may determine that the selected predictor set does not match the predicted predictor set. For instance, if there are only two predictor sets, then the decoder may determine that the selected predictor set is equal to the other predictor set, e.g. the predictor set that was not the predicted predictor set. If the second flag is cleared, then the decoder may determine that the selected prediction mode's mode number is equal to the predicted mode number. Otherwise, the decoder may determine that the selected prediction mode's mode number is not equal to the predicted mode number, and may subsequently read the encoded mode number that may specify the selected prediction mode's mode number.

The two-layer approach to intra prediction may produce significant bit savings over the conventional one-layer approach used in H.264. In one respect, the two layer approach may increase the probability for predicting the correct prediction mode, e.g. by reducing the number of possible incorrect prediction modes. For instance, a codec employing 18 prediction modes must predict the correct one out of 18 possible prediction modes when using a conventional one-layer approach. Alternatively, that same codec must only predict the correct one out of nine possible prediction mode numbers when using a two-layer approach as described herein. Thus, the two-layer approach may significantly increase the probability of successfully predicting the selected prediction mode, thereby enabling increased coding efficiencies over the single layer approach. In another respect, the two layer approach may use fewer bits to communicate a selected prediction mode when the prediction is incorrect. Specifically in the event of an incorrect prediction, the one-layer approach may communicate a total of six bits, e.g. one flag bit and five bits to indicate the selected one of the 18 possible prediction modes, while the two-layer method may only communicate five bits, e.g. two flag bits and three bits to indicate the selected one of the nine (remaining) possible prediction modes. Put differently, the two-layer method uses fewer bits to communicate the selected prediction mode, e.g. after an incorrect second-layer prediction, because the first-layer prediction narrows the number of possible prediction modes from 18 prediction modes to nine prediction modes.

FIG. 1A illustrates a standard predictor set 1100, which may be similar to the predictor set used in H.264. Specifically, the standard predictor set 1100 may comprise a directional sub-set of prediction modes and a non-directional sub-set of prediction modes. The directional sub-set of prediction modes may comprise a plurality of directional prediction modes, e.g. eight directional prediction modes, including a vertical prediction mode 100, a horizontal prediction mode 101, a diagonal-down-left prediction mode 103, a diagonal-down-right prediction mode 104, a vertical-right prediction mode 105, a horizontal-down prediction mode 106, a vertical-left prediction mode 107, a horizontal-up prediction mode 108, or combinations thereof. Each directional prediction mode may be used by a codec during intra prediction to interpolate a separate predicted block, e.g. a predicted block comprising a unique texture. For instance, the vertical prediction mode 100 may generate a predicted block comprising uniform columns, e.g. that are linearly interpolated from adjacent pixels located directly above the column, while the horizontal prediction mode 101 may generate a predicted block comprising uniform rows, e.g. that are linearly interpolated from the adjacent pixels located directly to the left of each respective row. The non-directional sub-set may comprise one non-directional prediction mode, such as a DC prediction mode 102. The DC prediction mode 102 may be interpolated from the average of adjacent pixel values from the surrounding neighboring blocks, e.g. the eight adjacent pixels located directly above and/or left of the predicted block. Alternatively, the non-directional sub-set may comprise other well known non-directional prediction modes, such as a template matching mode, a plane prediction mode, a planar mode, a bi-linear prediction mode, etc.

Figure 1B:
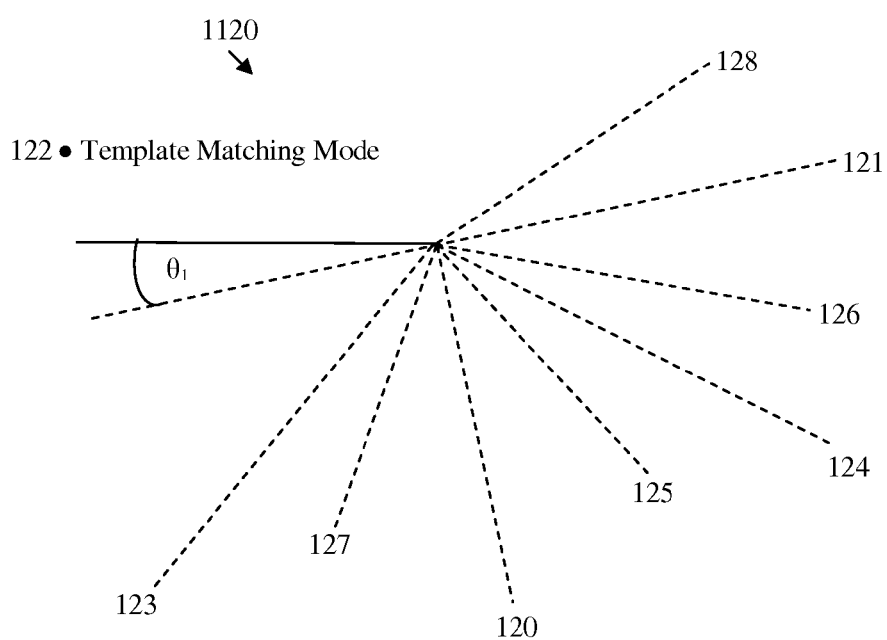

FIG. 1B illustrates an embodiment of a non-standard predictor set 1120, which may be used alone or in conjunction with another predictor set, e.g. the standard predictor set 101, during intra prediction coding. Specifically, the non-standard predictor set 1120 may comprise a similar sub-set structure to the standard predictor set 1100. For instance, the non-standard predictor set 1120 may comprise a directional sub-set and a non-directional sub-set. The non-standard predictor set's 1120 directional sub-set may correspond to the standard predictor set's 1100 directional sub-set. Specifically, the non-standard predictor set's 1120 direction sub-set may comprise eight rotated-directional prediction modes each of which comprising a corresponding one of the directional prediction modes, e.g. in the standard predictor set 1100, that has been rotated counterclockwise by an angle $\theta_1$, although clockwise rotation would also be acceptable. The angle $\theta_1$ may be variable, arbitrary, or fixed and may comprise any angle from about 0° to about 179°, e.g. about 5.625°, about 11.25°, about 12.5°, about 16.875°, etc. As such, the non-standard predictor set's 1120 rotated-directional prediction modes may include a rotated vertical prediction mode 120, a rotated horizontal prediction mode 121, a rotated diagonal-down-left prediction mode 123, a rotated diagonal-down-right prediction mode 124, a rotated vertical-right prediction mode 125, a rotated horizontal-down prediction mode 126, a rotated vertical-left prediction mode 127, a rotated horizontal-up prediction mode 128, or combinations thereof. In some embodiments, the non-standard predictor set's 1120 non-directional sub-set may utilize any one of a variety of well known non-directional interpolation techniques, such as a template matching mode 122. For instance, the non-standard predictor set's 1120 non-directional sub-set may implement the template matching 122, which may comprise searching for the nine adjacent pixels of a 4×4 block, or seventeen adjacent pixels of an 8×8 block, in a search area surrounding the predicted block, e.g. an "L" shaped 48×32 block of previously coded/decoded pixels located to the left and/or above the predicted block. Alternatively, other non-directional interpolation techniques such as a plane mode, a planar mode, a bi-linear mode, etc. could be used.

Figure 2:
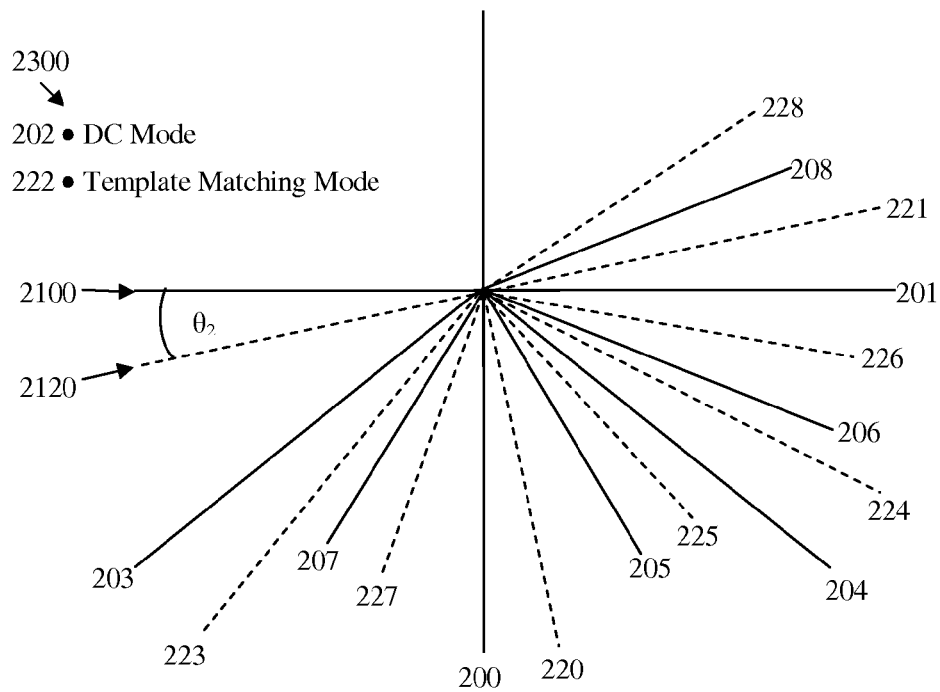
FIG. 2 is a schematic diagram of another embodiment of the predictor set that may be used during intra prediction.

FIG. 2 illustrates an embodiment comprising a multi-predictor set 2300. The multi-predictor set 2300 may comprise a standard predictor set 2100 and a non-standard predictor set 2120, which may be configured similar to the standard predictor set 1100 in FIG. 1A and the non-standard predictor set 1120 in FIG. 1B (respectively). For instance, the standard predictor set 2100 and the non-standard predictor set 2120 may have similar sub-set structures such that each predictor set comprises a directional sub-set of prediction modes and a non-directional sub-set of prediction modes.

In an embodiment, the standard predictor set's 2100 directional sub-set may comprise a plurality of directional prediction modes, including a vertical prediction mode 200, a horizontal prediction mode 201, a diagonal-down-left prediction mode 203, a diagonal-down-right prediction mode 204, a vertical-right prediction mode 205, a horizontal-down prediction mode 206, a vertical-left prediction mode 207, a horizontal-up prediction mode 208, or combinations thereof. In an embodiment, the standard predictor set's 2100 non-directional sub-set may comprise a non-directional prediction mode, such as a DC prediction mode 202. Prediction modes 200-208 may be configured similar to prediction modes 100-108 in FIG. 1A.

In an embodiment, the non-standard predictor set's 2120 directional sub-set may comprise a plurality of directional prediction modes, including a rotated vertical prediction mode 220, a rotated horizontal prediction mode 221, a rotated diagonal-down-left prediction mode 223, a rotated diagonal-down-right prediction mode 224, a rotated vertical-right prediction mode 225, a rotated horizontal-down prediction mode 226, a rotated vertical-left prediction mode 227, a rotated horizontal-up prediction mode 228, or combinations thereof. In the same or other embodiments, the non-standard predictor set's 2120 non-directional sub-set may comprise any one of a variety of known non-directional prediction modes, such as template matching mode 222. Alternatively, the non-standard predictor set's 2120 non-directional sub-set may comprise any other known non-directional prediction mode, e.g. a texture prediction mode, a plane prediction mode, a planar prediction mode, a bilinear prediction mode, etc. Prediction modes 220-228 may be configured similar to prediction modes 120-128 in FIG. 1B.

Due to their similar sub-set structures, one or more of the prediction modes in the standard predictor set 2100 may correspond to one or more prediction modes in the non-standard predictor set 2120. For instance, the vertical prediction mode 200 may correspond to the rotated vertical prediction mode 220, the horizontal prediction mode 201 may correspond to the rotated horizontal prediction mode 221, etc. In some embodiments, corresponding prediction modes may be referred to as prediction mode pairs, e.g. a vertical prediction mode pair may comprise the vertical prediction mode 200 and the rotated vertical prediction mode 220, a horizontal prediction mode pair may comprise the horizontal prediction mode 201 and the rotated horizontal prediction mode 221, etc. In some embodiments, the standard predictor set may be assigned a predictor-set-zero, and the non-standard predictor set may be assigned a predictor-set-one. In an embodiment, the predictor set number may be used during the first-layer prediction, e.g. where the predicted predictor set is determined by the minimum predictor set of some of the neighboring blocks. Each prediction mode pair may be associated with a mode number, e.g. mode-zero, mode-one, ..., mode-eight, based on quantitative intra mode number statistics, e.g. the statistical probability that one of the prediction modes in a pair will be selected for a given block (in a standard sequence) irrespective of the selected predictor set. In some embodiments, a lower mode number may correspond to a higher probability while a higher mode number may correspond to a lower probability. For instance, the vertical prediction mode pair may be associated with mode-zero, the horizontal prediction mode pair may be associated with mode-one, the non-directional prediction mode pair may be associated with mode-two, the diagonal-down-left prediction mode pair may be associated with mode-three, the diagonal-down-right prediction mode pair may be associated with mode-four, the vertical-right prediction mode pair may be associated with mode-five, the horizontal-down prediction mode pair may be associated with mode-six, the vertical-left prediction mode pair may be associated with mode-seven, and the horizontal-up prediction mode pair may be associated with mode-eight. In some embodiments, the mode number may be used during the second-layer prediction, e.g. where the predicted prediction mode is determined by the minimum prediction mode number of some of the neighboring blocks.

Figure 3:
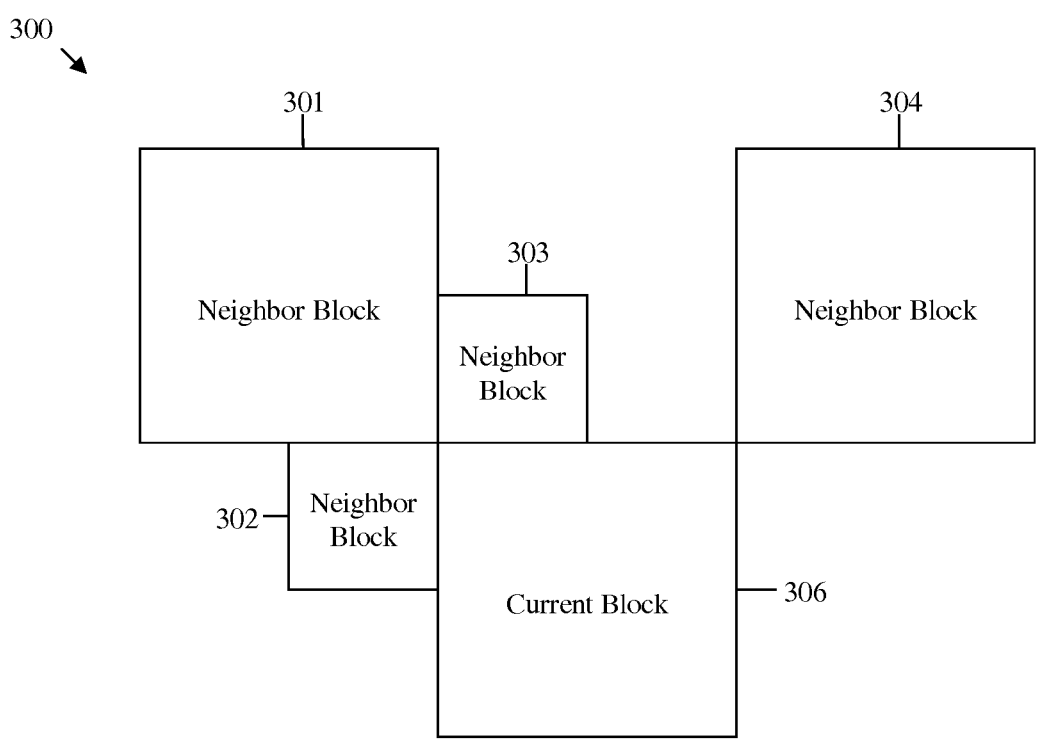
FIG. 3 is a schematic diagram of an embodiment of a group of blocks in a frame that may be processed using intra prediction encoding.

FIG. 3 illustrates an embodiment of a group of blocks 300 which may be used during intra prediction. The group of blocks 300 may comprise a plurality of neighbor blocks 301-304 and a current block 306. The plurality of neighbor blocks 301-304 may be previously coded/decoded blocks located to the left and/or above the current block 306. The current block 306 may correspond to an uncompressed block, e.g. on the encoder side. Alternatively, the current block 306 may correspond to a not yet decoded block, e.g. on the decoder side. The neighbor blocks 301-304 and/or the current block 306 may comprise various sizes and/or orientations, e.g. 4×4, 8×8, 16×16, 16×8, or any other array of pixels. Further, the inherent size and/or orientation of the blocks in FIG. 3, e.g. in respect to one another, is for illustrative purposes only. For instance, the inherent size and/or orientation of the neighboring blocks 301-304 and/or current block 306 may vary independently from one another.

In an embodiment, a codec may interpolate the pixel values of a predicted block, e.g. corresponding to the current block 306, from the adjacent pixel values of neighboring blocks 301-304 and/or other neighboring blocks that are not explicitly depicted in FIG. 3. The codec may also predict a predictor set and/or mode number, e.g. that corresponds with the current block 306, based on the predictor set and/or mode number of one or more of the neighboring blocks 301-304 using two-layer intra prediction. For instance, the codec may make a first-layer prediction of the predictor set based on the predictor set corresponding to the neighbor block 302 and the neighbor block 303. Subsequently, the codec may make a second-layer prediction of the mode number based on the mode number of the neighbor block 302 and the neighbor block 303, e.g. the lesser of the two mode numbers. For example, if neighbor block 302 comprises a prediction mode corresponding to (predictor-set-one, mode-two) and neighbor block 303 comprises a prediction mode corresponding to (predictor-set-zero, mode-six), then a two-layer prediction may generate a prediction mode corresponding to (predictor-set-zero, mode-two).

Figure 4:
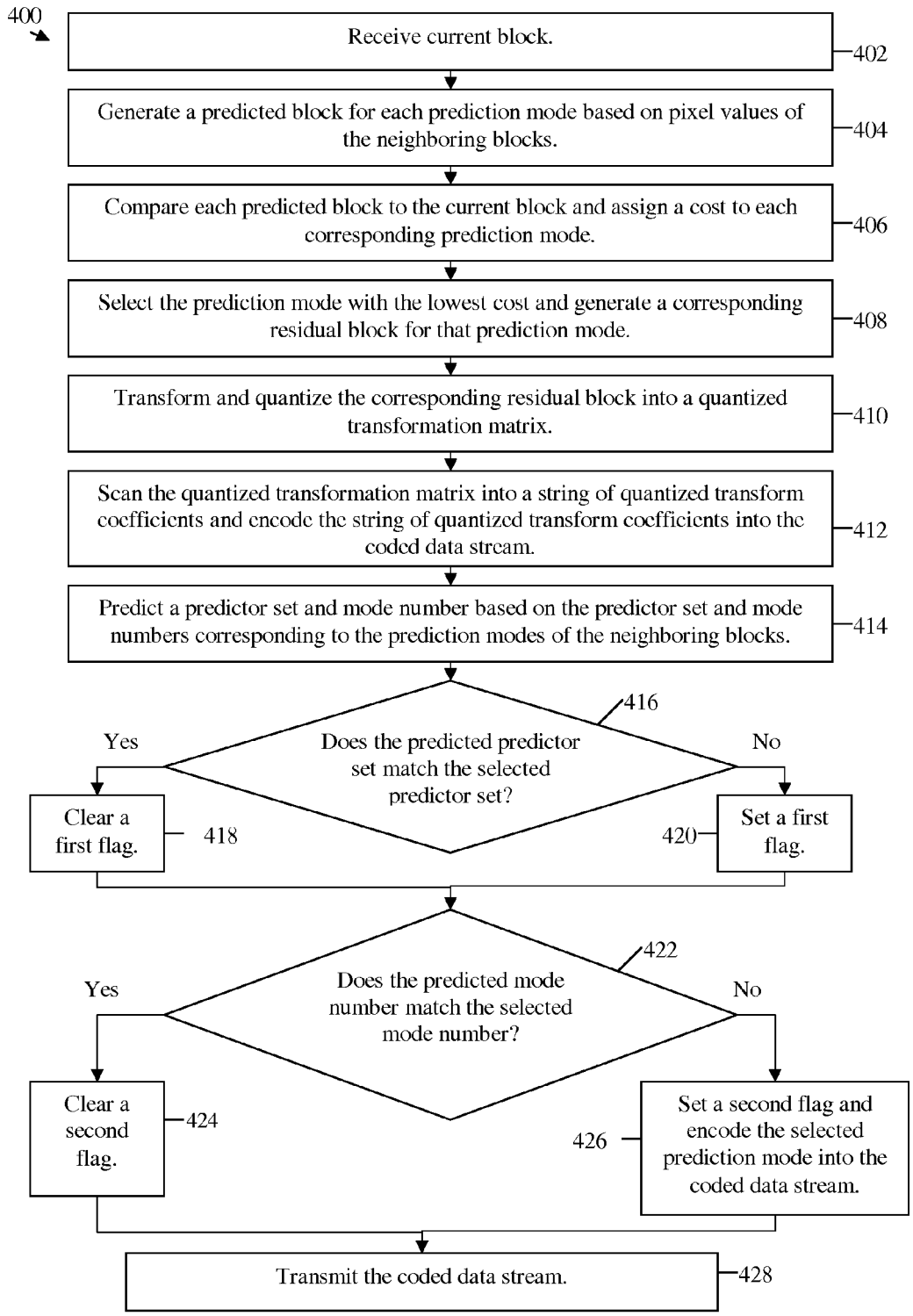
FIG. 4 is a flowchart of an embodiment of a method for encoding a current block using two-layer intra prediction.

FIG. 4 illustrates an embodiment of a two-layer intra prediction encoding method 400, which may be used by an encoder to compress video data. At step 402, the codec may receive a current block, e.g. a block of raw pixel values corresponding to an uncompressed image or frame. At step 404, the codec may generate a predicted block for each of a plurality of prediction modes based on the adjacent pixel values of the neighboring blocks. In some embodiments, each of the plurality of prediction modes may correspond to a unique (predictor set number, mode number) combination, as discussed above. At step 406, the codec may compare each predicted block to the current block, and assign a cost to each corresponding prediction mode. Assigning a cost to each corresponding prediction mode may comprise applying a cost function, e.g. a rate distortion optimization (RDO) algorithm, to determine an error rate for the predicted block. The cost may be indicative of a projected bit cost for the corresponding prediction mode, e.g. corresponding to the compressibility of a projected residual block. In some embodiments, a residual block may be generated for each prediction mode, and a statistical estimator, e.g. a means squared error function, may be applied to the residual block to determine the average error of the predicted block. At step 408, the codec may select the prediction mode with the lowest associated cost and generate a corresponding residual block. Alternatively, the residual block may have been generated during a previous step, e.g. during the RDO algorithm at step 406. At step 410, the codec may transform and quantize the corresponding residual block into a quantized transformation matrix, thereby compressing the residual block. Specifically, the transformation may comprise transforming the residual signal from the spatial domain to the frequency domain (e.g. using an integer transform or discrete cosign transform) such that the residual block (e.g. comprising a plurality of differential pixel values) is transformed into a transformation matrix (e.g. comprising a plurality of transform coefficients). In some embodiments, each of the transform coefficients may represent a different spatial frequency, with some of the spatial frequencies comprising varying degrees of significance, e.g. some of the alternating current (AC) frequencies that may be less significant to human visual perception. Quantization may comprise attenuating some of the less significant transform coefficients and rounding each transform coefficient to a discrete integer value. In some embodiments, one or more of the transform coefficients may be attenuated to near-zero values, and accordingly may be rounded to zero during quantization. As such, the quantized transformation matrix may comprise a significant number of zero coefficients. At step 412, the codec may scan the quantized transformation matrix into a string of quantized transform coefficients and encode the quantized transform coefficients into the coded data stream. The process of scanning and encoding may reduce the number of zero coefficients in the coded data stream, thereby further compressing the image.

At step 414, the codec may predict a predictor set and/or mode number, e.g. corresponding to the current block, based on the predictor set and/or mode number corresponding to the prediction mode of one or more neighboring blocks. For instance, the predicted predictor set may be equal to the smaller of the predictor sets corresponding to the prediction modes of the neighboring blocks located directly above and directly to the left of the current block. Additionally, the predicted mode number may be equal to the smaller of the mode numbers corresponding to the prediction modes of the neighboring blocks located directly above and directly to the left of the current block. Specifically, the predicted mode number may be determined irrespective of any known predictor sets (and vice versa). At step 416, the codec may determine whether the predicted predictor set matches the selected predictor set. If so, the codec may clear a first flag at step 418. Otherwise, the codec may set the first flag at step 420. In some embodiments, the flag may be about one bit in the overhead of the coded data stream that has a value of either zero or one, e.g. indicating a cleared status or a set status (respectively). At step 422, the codec may determine whether the predicted mode number matches the selected mode number. If so, the codec may clear a second flag at step 424. Otherwise, the codec may set the second flag and encode the selected prediction mode into the coded data stream at step 426. At step 428, the codec may transmit the coded data stream over a medium, e.g. in a communications network.

Figure 5:
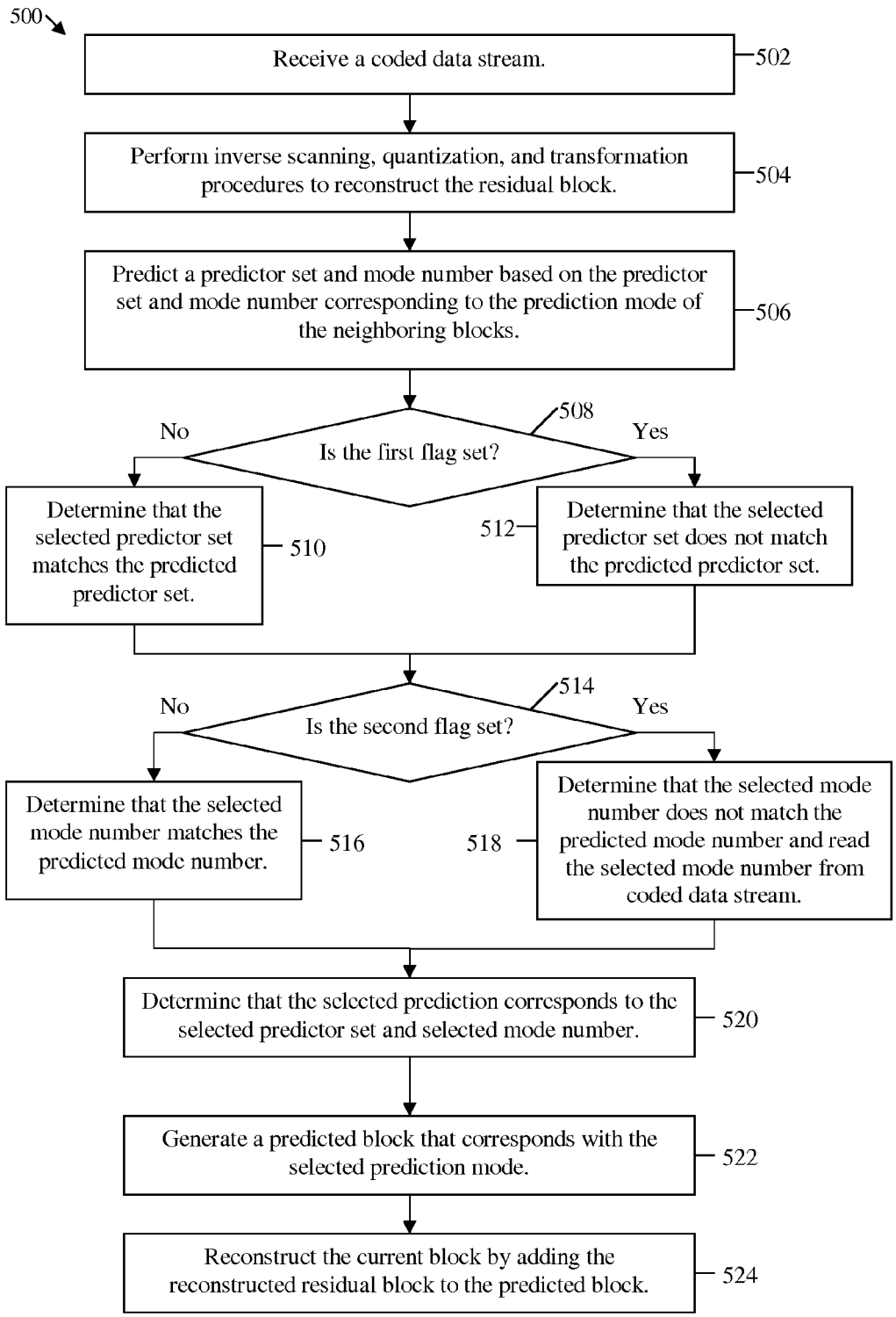
FIG. 5 is a flowchart of an embodiment of a method for decoding a current block using two-layer intra prediction.

FIG. 5 illustrates an embodiment of a two-layer intra prediction decoding method 500, which may be used by a decoder to reconstruct a current block from compressed video data, e.g. to de-compress encoded video data. At step 502, the codec may receive the coded data stream comprising compressed video data and overhead information. The compressed video data may comprise a string of quantized transform coefficients as well as other information that may be used to reconstruct the current block, e.g. a first flag, a second flag, and/or an encoded mode number. At step 504, the codec may perform inverse scanning, quantization, and transformation procedures to reconstruct the residual block from the string of quantized transform coefficients. The reconstructed residual block may be a close approximation of the residual block generated during encoding, e.g. the residual block generated at step 408 of the two-layer intra prediction encoding method 400. At step 506, the decoder may predict a predictor set and/or mode number based on the predictor set and/or mode number corresponding to the prediction mode of one or more neighboring blocks, e.g. previously decoded blocks located to the left and/or right of the soon to be reconstructed current block. In some embodiments, the prediction made in step 506 may be substantially similar, in some respects, to the prediction made in step 414, in that the predicted mode number may be determined irrespective of any known predictor sets (and vice versa). At step 508, the decoder may read the first flag to verify whether the first flag is set or cleared. If the first flag is cleared, then the decoder may determine the selected predictor set matches the predicted predictor set at step 510. Alternatively, if the first flag is set, then the encoder may determine that the selected predictor set does not match the predicted predictor set at step 512. Additionally at step 512, the encoder may determine that the selected predictor set matches the non-predicted predictor set, e.g. if the codec is using two predictor sets. At step 514, the encoder may read the second flag to verify whether the second flag is set or cleared. If the second flag is cleared, then the decoder may determine that the selected mode number matches the predicted mode number at step 516. Alternatively, if the second flag is set, then the decoder may determine that the selected mode number does not match the predicted mode number, and then subsequently reads the selected mode number from the coded data stream at step 518. At step 520, the decoder may determine that the selected prediction mode corresponds to the selected predictor set and the selected mode number. At step 522, the decoder may generate a predicted block that corresponds to the selected prediction mode. At step 524, the decoder may reconstruct the current block by adding the reconstructed residual block to the predicted block.

The two-layer intra prediction method disclosed herein may be expanded to multiple-layers, e.g. more than two layers, with similar considerations being given to each additional layer. In some embodiments, the predicted mode number may be predicted before the predicted group number, such that the second flag is set/cleared and/or read prior to the first flag. Ultimately, the two-layer technique described herein may be compatible with key technical areas (KTA) software, and the coding gain achieved may be enhanced when implemented with other KTA tools, such as Adaptive loop filter, among others. Additionally, using predictor sets comprising similar sub-set structures may reduce the computational complexity on the encoder and/or decoder side by utilizing, in some situations, relatively simple arithmetic computations, such as additions and right shifts similar to H.264. Example coding implementations may include introducing a predictor_set_flag to indicate the predicted predictor set. In some embodiments, the syntax in the bit stream may be as follows:

---
If (transform_8X8_mode) flag && mb_type ==1_NxN)
{
transform_size_8X8_flag
predictor_set_flag
}
---

EXAMPLE

The proposed method was implemented into KTA software jm11.0kta2.6r1, and experiments were performed on intra-coded frames (I frames) according to the joint collaborative team (JCT) on Video Coding (JCT-VC) call for proposals (CFP) constraints set 1 and 2. The experimental results were set as follows: Constraint set 1 and 2 (All I-frame, Context-adaptive binary arithmetic coding (CABAC)), Constraint set 2 (All I-frame, Context-adaptive variable-length coding (CAVLC)); multiple predictor sets for intra coding (MPSI) is applied to Intra 4×4 and Intra 8×8 prediction for all constraint sets; rate distortion optimization (RDO) enabled; RDO quantization (RDOQ) enabled; Full length CFP test sequences (Wide quarter video graphics array (WQVGA), Wide video graphics array (WVGA), 720 p and high definition (HD)); Use Quasi-Poisson (QP) defined in Alpha anchor. Table 1 shows the results in the Constraint set 1 and 2 (CABAC), and Table 2 shows the experimental results in the case of Constraint set 2 (CAVLC). Average peak signal to noise ratio (PSNR) gain and bit reduction are calculated based on the Bjontegarrd method. In the case of Constraint set 1 and 2 (CABAC), the average bit reduction is about 3.14 percent for all sequences, 1.84 percent for WQVGA, 3.61 percent for WVGA, 4.18 percent for 720 p, and 3.18 percent for 1080 p. Picture size larger than WQVGA has apparently better gain. In the case of Constraint set 2 (CAVLC), the average bit reduction is 3.89 percent for all sequences, 2.20 percent for WQVGA, about 4.1 percent for WVGA, and about 5.32 percent for 720 p, and 4.22 percent for 1080 p. Picture size larger than WQVGA appears to have better gain.

TABLE 1

Coding efficiency of Constraint set 1 and 2 (CABAC, MPSI only)

| Resolution | Sequence | Bitrate | Δ Bitrate (%) | Δ PSNR (dB) |
|---|---|---|---|---|
| Class D WQVGA 416 × 240 | BasketballPass | High | −2.13 | 0.13 |
| | | Low | −2.39 | 0.13 |
| | BQSqure | High | −2.01 | 0.17 |
| | | Low | −2.31 | 0.17 |
| | BlowingBubbles | High | −1.23 | 0.09 |
| | | Low | −1.52 | 0.09 |
| | RaceHorses | High | −1.37 | 0.10 |
| | | Low | −1.75 | 0.11 |
| Average coding efficiency for WQVGA | | | −1.84 | 0.13 |
| Class C WVGA 832 × 480 | PartyScene | High | −1.56 | 0.09 |
| | | Low | −1.79 | 0.08 |
| | BQMall | High | −3.10 | 0.17 |
| | | Low | −3.41 | 0.18 |
| | BasketballDrill | High | −7.33 | 0.34 |
| | | Low | −7.22 | 0.33 |
| | RaceHorses | High | −2.12 | 0.11 |
| | | Low | −2.33 | 0.11 |
| Average coding efficiency for WVGA | | | −3.61 | 0.18 |
| Class E 720p 1280 × 720 | Vidyo1 | High | −4.81 | 0.26 |
| | | Low | −4.96 | 0.28 |
| | Vidyo3 | High | −3.91 | 0.24 |
| | | Low | −4.59 | 0.28 |
| | Vidyo4 | High | −3.25 | 0.17 |
| | | Low | −3.57 | 0.18 |
| Average coding efficiency for 720p | | | −4.18 | 0.23 |
| Class B 1080p 832 × 480 | Kimono | High | −1.60 | 0.05 |
| | | Low | −1.87 | 0.07 |
| | Cactus | High | −3.64 | 0.14 |
| | | Low | −4.37 | 0.17 |
| | BasketballDrive | High | −3.50 | 0.11 |
| | | Low | −4.36 | 0.14 |
| | BQTerrace | High | −4.77 | 0.21 |
| | | Low | −5.55 | 0.24 |
| | Parkscene | High | −0.97 | 0.05 |
| | | Low | −1.16 | 0.05 |
| Average coding efficiency for 1080p | | | −3.18 | 0.12 |
| Average Coding efficiency for all sequences | | | −3.14 | 0.16 |

TABLE 2

Coding efficiency of Constraint set 2 (CAVLC, MPSI only)

| Resolution | Sequence | Bitrate | Δ Bitrate (%) | Δ PSNR (dB) |
|---|---|---|---|---|
| Class D | BasketballPass | High | −2.67 | 0.18 |
| WQVGA | | Low | −3.05 | 0.18 |
| 416 × 240 | BQSqure | High | −2.36 | 0.21 |
| | | Low | −2.66 | 0.21 |
| | BlowingBubbles | High | −1.39 | 0.11 |
| | | Low | −1.68 | 0.11 |
| | RaceHorses | High | −1.69 | 0.13 |
| | | Low | −2.12 | 0.14 |
| Average coding efficiency for WQVGA | | | −2.20 | 0.16 |
| Class C | PartyScene | High | −1.75 | 0.10 |
| WVGA | | Low | −1.93 | 0.10 |
| 832 × 480 | BQMall | High | −3.84 | 0.24 |
| | | Low | −4.18 | 0.25 |
| | BasketballDrill | High | −7.91 | 0.41 |
| | | Low | −7.54 | 0.38 |
| | RaceHorses | High | −2.64 | 0.15 |
| | | Low | −2.99 | 0.15 |
| Average coding efficiency for WVGA | | | −4.10 | 0.22 |
| Class E | Vidyo1 | High | −5.66 | 0.35 |
| 720p | | Low | −5.74 | 0.37 |
| 1280 × 720 | Vidyo3 | High | −5.55 | 0.38 |
| | | Low | −6.34 | 0.44 |
| | Vidyo4 | High | −4.18 | 0.24 |
| | | Low | −4.42 | 0.26 |
| Average coding efficiency for 720p | | | −5.32 | 0.34 |
| Class B | Kimono | High | −2.65 | 0.10 |
| 1080p | | Low | −3.13 | 0.14 |
| 832 × 480 | Cactus | High | −4.47 | 0.19 |
| | | Low | −5.26 | 0.23 |
| | BasketballDrive | High | −4.69 | 0.17 |
| | | Low | −5.63 | 0.22 |
| | BQTerrace | High | −6.05 | 0.29 |
| | | Low | −6.97 | 0.34 |
| | Parkscene | High | −1.49 | 0.08 |
| | | Low | −1.80 | 0.09 |
| Average coding efficiency for 1080p | | | −4.22 | 0.19 |
| Average Coding efficiency for all sequences | | | −3.89 | 0.22 |

Table 3 shows the results when MPSI works together with Adaptive Loop Filter (ALF). The anchor is only turning on ALF, whereas the current proposal is turning on both MPSI and ALF. The case of Constraint set 1 and 2 (CABAC) is tested. The average bit reduction is 3.36 percent for all sequences, 1.89 percent for WQVGA, 3.65 percent for WVGA, 4.74 percent for 720 p, and 3.48 percent for 1080 p.

TABLE 3

Coding efficiency of Constraint set 1 and 2 (CABAC, MPSI + ALF)
Anchor: Only ALF is turned on;
Proposed: Both MPSI and ALF are turned on

| Resolution | Sequence | Bitrate | Δ Bitrate (%) | Δ PSNR (dB) |
|---|---|---|---|---|
| Class D | BasketballPass | High | −2.33 | 0.15 |
| WQVGA | | Low | −2.53 | 0.14 |
| 416 × 240 | BQSqure | High | −1.99 | 0.17 |
| | | Low | −2.29 | 0.17 |
| | BlowingBubbles | High | −1.22 | 0.09 |
| | | Low | −1.53 | 0.09 |
| | RaceHorses | High | −1.46 | 0.11 |
| | | Low | −1.78 | 0.11 |
| Average coding efficiency for WQVGA | | | −1.89 | 0.13 |
| Class C | PartyScene | High | −1.56 | 0.09 |
| WVGA | | Low | −1.74 | 0.08 |
| 832 × 480 | BQMall | High | −3.26 | 0.18 |
| | | Low | −3.51 | 0.19 |
| | BasketballDrill | High | −7.21 | 0.34 |
| | | Low | −7.14 | 0.33 |
| | RaceHorses | High | −2.20 | 0.12 |
| | | Low | −2.55 | 0.12 |

TABLE 3-continued

Coding efficiency of Constraint set 1 and 2 (CABAC, MPSI + ALF)
Anchor: Only ALF is turned on;
Proposed: Both MPSI and ALF are turned on

| Resolution | Sequence | Bitrate | Δ Bitrate (%) | Δ PSNR (dB) |
|---|---|---|---|---|
| Average coding efficiency for WVGA | | | −3.65 | 0.18 |
| Class E | Vidyo1 | High | −5.20 | 0.28 |
| 720p | | Low | −5.31 | 0.30 |
| 1280 × 720 | Vidyo3 | High | −4.83 | 0.30 |
| | | Low | −5.59 | 0.35 |
| | Vidyo4 | High | −3.61 | 0.19 |
| | | Low | −3.93 | 0.20 |
| Average coding efficiency for 720p | | | −4.74 | 0.27 |
| Class B | Kimono | High | −1.99 | 0.06 |
| 1080p | | Low | −2.23 | 0.08 |
| 832 × 480 | Cactus | High | −4.00 | 0.15 |
| | | Low | −4.80 | 0.19 |
| | BasketballDrive | High | −3.98 | 0.12 |
| | | Low | −4.89 | 0.16 |
| | BQTerrace | High | −4.82 | 0.20 |
| | | Low | −5.53 | 0.23 |
| | Parkscene | High | −1.18 | 0.06 |
| | | Low | −1.35 | 0.06 |
| Average coding efficiency for 1080p | | | −3.48 | 0.13 |
| Average Coding efficiency for all sequences | | | −3.36 | 0.17 |

Complexity analysis (Encoding time and measurement methodology): The encoding time is measured on a DellT7500 workstation. The computer has eight 2.4G Xeon cores with 12 GB installed memory. The operation system is 64 bit Windows 7 professional. The anchor and the proposed algorithm are running simultaneously to test the encoding time. Table 4 and Table 5 give the comparison results of encoding time. The average encoding time increasing is 102.24 percent for all sequences of Constraint sets 1 and 2 (CABAC, MPSI) and 103.99% for all sequences of Constraint set 2 (CAVLC, MPSI). Because the number of candidates for deciding the best predictor set is doubled, the encoding time is also doubled.

TABLE 4

Encoding time comparison of Constraint set 1 and 2 (CABAC, MPSI only)

| Resolution | Sequence | Average Δ Time (%) |
|---|---|---|
| Class D | BasketballPass | 102.4457547 |
| WQVGA | BQSqure | 98.79243861 |
| 416 × 240 | BlowingBubbles | 95.27065458 |
| | RaceHorses | 99.66727287 |
| WQVGA Average | | 99.04403018 |
| Class C | PartyScene | 102.0096679 |
| WVGA | BQMall | 105.091504 |
| 832 × 480 | BasketballDrill | 104.4768222 |
| | RaceHorses | 104.3397826 |
| WVGA Average | | 103.9794442 |
| Class E | Vidyo1 | 105.6655913 |
| 720p | Vidyo3 | 108.5042937 |
| 1280 × 720 | Vidyo4 | 107.5252656 |
| 720p Average | | 107.2317169 |
| Class B | Kimono | 100.2774867 |
| 1080p | Cactus | 100.9915225 |
| 832 × 480 | BasketballDrive | 103.4756683 |
| | BQTerrace | 100.0307788 |
| | Parkscene | 97.33944029 |
| 1080p Average | | 100.4229793 |
| All Average | | 102.2439965 |

TABLE 5

Encoding time comparison of Constraint set 1 and 2 (CAVLC, MPSI only)

| Resolution | Sequence | Average Δ Time (%) |
|---|---|---|
| Class D | BasketballPass | 102.4477706 |
| WQVGA | BQSqure | 98.4877664 |
| 416 × 240 | BlowingBubbles | 98.05588703 |
|  | RaceHorses | 99.12481752 |
| WQVGA Average |  | 99.52906038 |
| Class C | PartyScene | 102.1773402 |
| WVGA | BQMall | 105.9983546 |
| 832 × 480 | BasketballDrill | 104.5288646 |
|  | RaceHorses | 104.8334235 |
| WVGA Average |  | 104.3844957 |
| Class E | Vidyo1 | 110.5624321 |
| 720p | Vidyo3 | 112.7659786 |
| 1280 × 720 | Vidyo4 | 111.6514325 |
| 720p Average |  | 111.6599477 |
| Class B | Kimono | 103.3904962 |
| 1080p | Cactus | 102.0298208 |
| 832 × 480 | BasketballDrive | 105.5615468 |
|  | BQTerrace | 101.0145559 |
|  | Parkscene | 101.2611463 |
| 1080p Average |  | 102.6515132 |
| All Average |  | 103.9932271 |

Decoding time and measurement methodology: The decoding time is measured by the same methodology as encoding time measurement. Table 6 and Table 7 give the comparison results of decoding time. The average decoding time increasing is 27.43 percent for all sequences of Constraint sets 1 and 2 (CABAC, MPSI) and 56.95 percent for all sequences of Constraint set 2 (CAVLC, MPSI). The decoding time increasing is mainly caused by template matching, because the best matching block is also to be derived at the decoder side.

TABLE 6

Decoding time comparison of Constraint set 1 and 2 (CABAC, MPSI only)

| Resolution | Sequence | Average Δ Time (%) |
|---|---|---|
| Class D | BasketballPass | 23.47309712 |
| WQVGA | BQSqure | 33.46427433 |
| 416 × 240 | BlowingBubbles | 15.89815009 |
|  | RaceHorses | 15.48483755 |
| WQVGA Average |  | 22.08008977 |
| Class C | PartyScene | 21.05240191 |
| WVGA | BQMall | 28.798849 |
| 832 × 480 | BasketballDrill | 48.77927175 |
|  | RaceHorses | 22.12729643 |
| WVGA Average |  | 30.18945477 |
| Class E | Vidyo1 | 33.76548223 |
| 720p | Vidyo3 | 35.36019598 |
| 1280 × 720 | Vidyo4 | 26.42970573 |
| 720p Average |  | 31.85179465 |
| Class B | Kimono | 15.79685619 |
| 1080p | Cactus | 29.38907485 |
| 832 × 480 | BasketballDrive | 32.09230938 |
|  | BQTerrace | 42.74053321 |
|  | Parkscene | 14.1785734 |
| 1080p Average |  | 26.8394694 |
| All Average |  | 27.42693182 |

TABLE 7

Decoding time comparison of Constraint set 2 (CAVLC, MPSIonly)

| Resolution | Sequence | Average Δ Time (%) |
|---|---|---|
| Class D | BasketballPass | 55.28289284 |
| WQVGA | BQSqure | 75.37015466 |
| 416 × 240 | BlowingBubbles | 34.19103086 |
|  | RaceHorses | 30.50940605 |
| WQVGA Average |  | 48.8383711 |
| Class C | PartyScene | 50.33924228 |
| WVGA | BQMall | 64.09627475 |
| 832 × 480 | BasketballDrill | 90.0725856 |
|  | RaceHorses | 48.77977019 |
| WVGA Average |  | 63.32196821 |
| Class E | Vidyo1 | 60.10529794 |
| 720p | Vidyo3 | 64.88537557 |
| 1280 × 720 | Vidyo4 | 51.62854064 |
| 720p Average |  | 58.87307138 |
| Class B | Kimono | 45.21076348 |
| 1080p | Cactus | 59.31883964 |
| 832 × 480 | BasketballDrive | 57.08535512 |
|  | BQTerrace | 81.52498469 |
|  | Parkscene | 42.76055492 |
| 1080p Average |  | 57.18009957 |
| All Average |  | 56.94756683 |

Analysis: For MPSI, the analysis of the selection repartition between the original or new predictor sets is depicted in Table 8. Set0 is the original predictor set in H.264/advanced video coding (AVC), and Set1 is the new predictor set in this proposal. 4×4, 8×8 and 16×16 represents the block size. It shows that on average on the test set, the new predictor is selected 12.8 percent for 4×4 blocks and 24.29 percent for 8×8 blocks. Given that the selection results from a RD choice, this result confirms that the MPSI is useful. Note that these values exclude the cases where both predictors provide the same value, under which the original predictor has the priority to be selected.

TABLE 8

Average percentage of the appearance of different predictor sets of Constraint set 1 and 2 (CABAC, MPSI only)

| Resolution | Sequence | Average Percentage of Appearance (%) | | | | |
|---|---|---|---|---|---|---|
|  |  | Set 0 4 × 4 | Set 1 4 × 4 | Set 0 8 × 8 | Set 1 8 × 8 | 16 * 16 |
| Class D | BasketballPass | 18.37 | 12.39 | 30.63 | 22.57 | 16.04 |
| WQVGA | BQSqure | 32.19 | 31.95 | 12.25 | 11.33 | 12.28 |
| 416 × 240 | BlowingBubbles | 41.14 | 26.35 | 17.94 | 11.99 | 2.58 |
|  | RaceHorses | 20.01 | 18.12 | 32.59 | 24.78 | 4.51 |
| WQVGA Average |  | 27.92 | 22.20 | 23.35 | 17.67 | 8.85 |
| Class C | PartyScene | 30.09 | 16.13 | 23.75 | 15.35 | 14.68 |
| WVGA | BQMall | 17.48 | 9.62 | 26.47 | 21.61 | 24.82 |

TABLE 8-continued

Average percentage of the appearance of different predictor sets of
Constraint set 1 and 2 (CABAC, MPSI only)

| | | Average Percentage of Appearance (%) | | | | |
|---|---|---|---|---|---|---|
| Resolution | Sequence | Set 0 4 × 4 | Set 1 4 × 4 | Set 0 8 × 8 | Set 1 8 × 8 | 16 * 16 |
| 832 × 480 | BasketballDrill | 6.61 | 16.10 | 22.03 | 39.84 | 15.41 |
| | RaceHorses | 8.96 | 10.21 | 27.77 | 28.29 | 24.76 |
| | WVGA Average | 15.79 | 13.02 | 25.00 | 26.27 | 19.92 |
| Class E | Vidyo1 | 5.16 | 5.57 | 22.41 | 28.64 | 38.22 |
| 720 p | Vidyo3 | 9.37 | 6.49 | 19.05 | 19.51 | 45.57 |
| 1280 × 720 | Vidyo4 | 7.04 | 4.32 | 25.67 | 24.98 | 37.98 |
| | 720 p Average | 7.19 | 5.46 | 22.38 | 24.38 | 40.59 |
| Class D | Kimono | 2.50 | 2.72 | 38.58 | 36.66 | 19.54 |
| WQVGA | Cactus | 10.82 | 11.35 | 29.75 | 29.15 | 18.93 |
| 416 × 240 | BasketballDrive | 10.94 | 5.68 | 29.69 | 23.46 | 30.22 |
| | BQTerrace | 13.35 | 18.74 | 22.14 | 25.03 | 20.74 |
| | Parkscene | 12.15 | 9.06 | 35.22 | 25.51 | 18.06 |
| | 1080 p Average | 9.95 | 9.51 | 31.07 | 27.96 | 21.50 |
| | All Average | 15.39 | 12.80 | 26.00 | 24.29 | 21.52 |

The proposed method improves the coding efficiency of Intra frames by using multiple predictor sets. A new predictor set with similar subsets as in H.264/AVC is introduced to get better prediction of local images with complex textures. The same method in H.264/AVC can be used to predict the intra prediction mode. The selected predictor set is indicated on a macroblock level. MPSI achieves 3.14 percent bit reduction at Constraint sets 1 and 2 (CABAC), and 3.89 percent bit reduction at Constraint set 2 (CAVLC) on average. Moreover, MPSI is compatible with other KTA tools, and is able to achieve more coding gain when used together. This technique can also be integrated into block sizes larger than 8×8 with more predictor sets.

Figure 6:
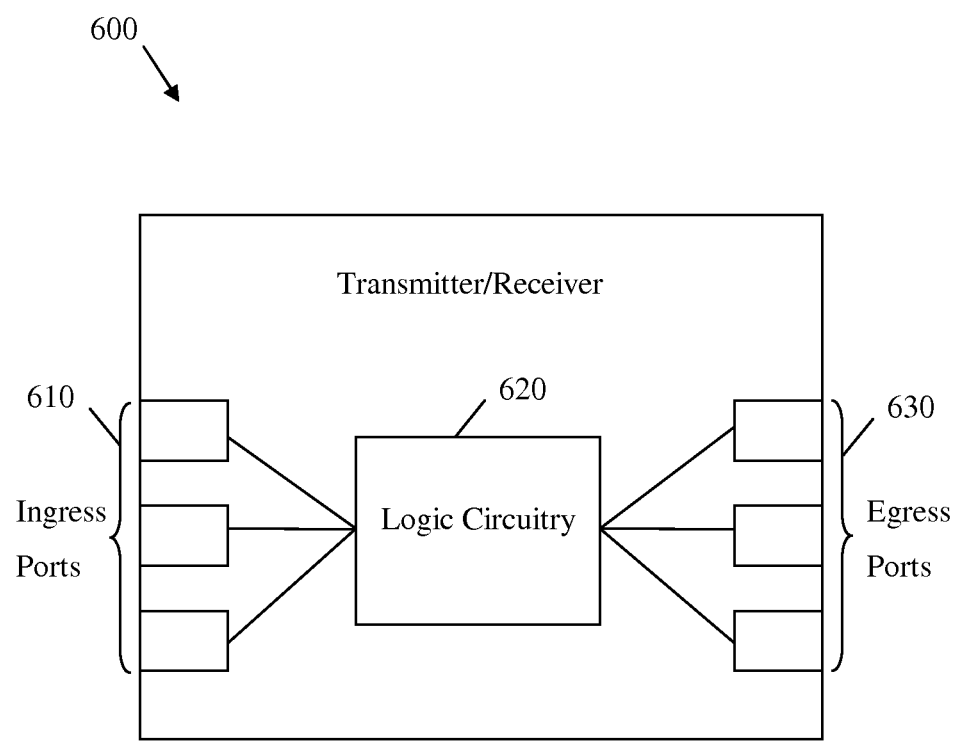
FIG. 6 is a schematic diagram of an embodiment of a transmitter/receiver unit.

FIG. 6 illustrates an embodiment of a transmitter/receiver unit 600, which may be located at, coupled to, or part of any of the codecs described herein or any other component within the network or system. The transmitter/receiver unit 600 may be any device that processes images as described herein. For instance, the transmitter/receiver unit 600 may correspond to or may be located in a media controller at an image transmitter and/or receiver. The transmitted/receiver unit 600 may comprise a plurality of ingress ports or receiver units 610 for receiving data from other codecs, logic circuitry 620 to determine which codecs to send the data to, and a plurality of egress ports or transmitter units 630 for transmitting data to the other codecs.

Figure 7:
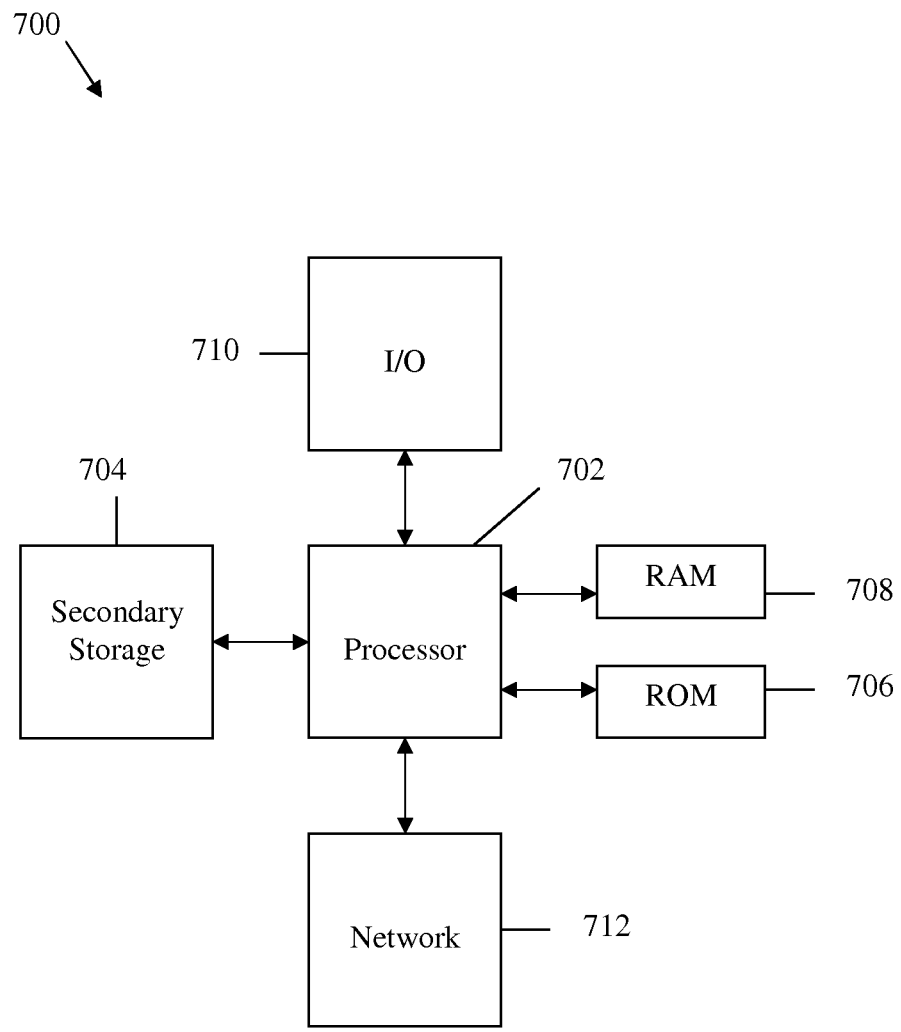
FIG. 7 is a schematic diagram of an embodiment of an exemplary general-purpose computer system.

The codecs described above may be implemented on any general-purpose network component, such as a computer or network component with sufficient processing power, memory resources, and network throughput capability to handle the necessary workload placed upon it. FIG. 7 illustrates a typical, general-purpose network component suitable for implementing one or more embodiments of a node disclosed herein. The network component 700 includes a processor 702 (which may be referred to as a central processor unit or CPU) that is in communication with memory devices including secondary storage 704, read only memory (ROM) 706, random access memory (RAM) 708, input/output (I/O) 710 devices, and network connectivity devices 712. The processor may be implemented as one or more CPU chips, or may be part of one or more application specific integrated circuits (ASICs) and/or digital signal processors (DSPs).

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_{1+k}*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising a processor configured to:
receive a current block of an image;
determine an optimal prediction mode of a plurality of prediction modes for the current block, wherein the optimal prediction mode corresponds to either a standard predictor set or a non-standard predictor set;
predict a predicted predictor set based on a first known predictor set and a second known predictor set;
clear a first flag if the predicted predictor set matches the optimal predictor set; and
set the first flag if the predicted predictor set does not match the optimal predictor set.

2. The apparatus of claim 1, wherein the predicted predictor set is predicted independent from any known mode numbers.

3. The apparatus of claim 2, wherein the standard predictor set comprises a first non-directional prediction mode and eight directional prediction modes used in International Telecommunications Union (ITU) Telecommunications Standardization Sector (ITU-T) H.264, wherein the non-standard predictor set comprises a second non-directional prediction mode and eight rotated-directional prediction modes each of which comprises a corresponding one of the eight directional prediction modes that has been rotated by an angle θ.

4. The apparatus of claim 3, wherein the first known predictor set corresponds to a first neighboring block of the image that is located above the current block, wherein the second known predictor set corresponds to a second neighboring block of the image that is located to the left of the current block, and wherein each of the first and second known predictor sets comprise either the standard predictor set or the non-standard predictor set.

5. The apparatus of claim 4, wherein the predicted predictor set comprises the standard predictor set if either the first known predictor set or the second known predictor set comprises the standard predictor set, otherwise the predicted predictor set comprises the non-standard predictor set.

6. The apparatus of claim 5, wherein the first non-directional prediction mode corresponds to the second non-directional prediction mode, and wherein each corresponding pair of prediction modes is assigned a unique mode number.

7. The apparatus of claim 6, wherein the processor is further configured to:
predict a predicted mode number based on a first mode number corresponding to the first neighboring block and a second mode number corresponding to the second neighboring block, wherein the predicted mode number is predicted independent of any known predictor sets;
determine whether the predicted mode number matches a selected mode number corresponding to the selected prediction mode; and
clear a second flag if the predicted mode number matches the selected mode number, otherwise set the second flag and encode the selected mode number.

8. An apparatus comprising:
a receiver unit configured to receive a coded data stream comprising a residual block, a first flag, and a second flag, wherein the residual block corresponds to a current block of an image; and
logic circuitry configured to: predict a predicted predictor set based on a first known predictor set and a second known predictor set; determine that a selected predictor set comprises the predicted predictor set when the first flag is cleared; and determine that a selected predictor set comprises a non-predicted predictor set when the first flag is set.

9. The apparatus of claim 8, wherein the predicted predictor set is predicted independent from any known mode numbers.

10. The apparatus of claim 8, wherein each of the predicted predictor set, the first known predictor set, and the second known predictor set comprise either a standard predictor set or a non-standard predictor set, and wherein the standard predictor set comprises eight directional prediction modes used in International Telecommunications Union (ITU) Telecommunications Standardization Sector (ITU-T) H.264 and a first non-directional DC prediction mode.

11. The apparatus of claim 10, wherein the non-standard predictor set comprises eight rotated-directional prediction modes and a second non-directional prediction mode, wherein each of the eight rotated-directional prediction modes comprise a corresponding one of the eight directional prediction modes that has been rotated by an angle θ, wherein the first non-directional prediction mode corresponds to the second non-directional prediction mode, and wherein each corresponding pair of prediction modes is assigned a unique one of a plurality of mode numbers.

12. The apparatus of claim 11, wherein the first known predictor set corresponds to a first neighboring block that is located above the reconstructed current block, and wherein the second known predictor set corresponds to a second neighboring block that is located to the left of the reconstructed current block.

13. The apparatus of claim 12, wherein the logic circuitry is further configured to:
predict a predicted mode number based on a first mode number corresponding to the first neighboring block and a second mode number corresponding to the second neighboring block, wherein the predicted mode number is predicted independent of any known predictor sets;
determine that a selected prediction mode comprises a predicted prediction mode when the second flag is cleared, wherein the predicted prediction mode corresponding to the predicted mode number and the selected predictor set;

determine that a selected prediction mode comprises a non-predicted prediction mode when the second flag is set, wherein the non-predicted prediction mode corresponds to an encoded mode number and a selected predictor set; and reconstruct the current block by adding the residual block to a predicted block that corresponds to the selected prediction mode.

14. The apparatus of claim 13, wherein coded data stream further comprises the encoded mode number, and wherein the encoded mode number comprises about three bits and does not indicate the selected predictor set.

15. A method implemented by a processor, the method comprising:

predicting a predicted predictor set based on one or more known predictor sets;

determining whether a selected prediction mode's predictor set matches the predicted predictor set;

predicting a predicted mode number based on one or more known mode numbers; and determining whether the selected prediction mode's mode number matches the predicted mode number.

16. The method of claim 15 further comprising clearing a first flag when the selected prediction mode's predictor set matches the predicted predictor set;

setting the first flag when the selected prediction mode's predictor set does not match the predicted predictor set;

clearing a second flag when the selected prediction mode's mode number matches the predicted mode number; and setting the second flag when the selected prediction mode's mode number does not match the predicted mode number.

17. The method of claim 16, wherein the selected prediction mode's predictor set does not match the predicted predictor set, wherein the selected prediction mode's mode number does not match the predicted mode number, and wherein the method further comprises encoding the selected prediction mode's mode number without encoding the selected prediction mode's predictor set.

18. The method of claim 15 further comprising receiving a coded data stream comprising a first flag and a second flag, wherein determining whether the selected prediction mode's predictor set matches the predicted predictor set comprises reading the first flag, and wherein determining whether the selected prediction mode's mode number matches the predicted mode number comprises reading the second flag.

19. The method of claim 18, wherein the first flag indicates that the selected prediction mode's predictor set does not match the predicted predictor set, wherein the second flag indicates that the selected prediction mode's mode number does not match the predicted mode number, and wherein the coded data stream further comprises an encoded mode number, and wherein the encoded mode number comprises about three bits and does not indicate the selected prediction mode's predictor set.

20. The method of claim 18, wherein the second flag indicates that the selected prediction mode's mode number does match the predicted mode number, and wherein only two bits of overhead in the coded data stream are used to communicate the selected prediction mode.

* * * * *